United States Patent

Äijälä

Patent Number: 5,997,602
Date of Patent: *Dec. 7, 1999

[54] AQUEOUS FERTILZER SUSPENSION CONTAINING AT LEAST PHOSPHATE IONS AND CALCIUM OR MAGNESIUM IONS AND A USE OF THE SUSPENSION

[75] Inventor: Hannu Äijälä, Helsinki, Finland

[73] Assignee: Kemira Agro Oy, Helsinki, Finland

[ * ] Notice: This patent is subject to a terminal disclaimer.

[21] Appl. No.: 08/981,104

[22] PCT Filed: Jun. 20, 1996

[86] PCT No.: PCT/FI96/00360

§ 371 Date: Mar. 23, 1998

§ 102(e) Date: Mar. 23, 1998

[87] PCT Pub. No.: WO97/00840

PCT Pub. Date: Jan. 9, 1997

[30] Foreign Application Priority Data

Jun. 22, 1995 [FI] Finland ..................................... 953155

[51] Int. Cl.⁶ ..................................................... C05G 5/00
[52] U.S. Cl. .......................... 71/28; 71/29; 71/30; 71/33; 71/34; 71/35; 71/36; 71/48; 71/49; 71/50; 71/51; 71/53; 71/58; 71/59; 71/60; 71/61; 71/63; 71/64.08
[58] Field of Search ................................. 71/29, 64.1, 34, 71/30, 64.08, 28, 33, 35, 36, 48, 49, 50, 51, 53, 59, 60

[56] References Cited

U.S. PATENT DOCUMENTS

| | | | |
|---|---|---|---|
| 3,656,931 | 4/1972 | Dancy | 71/33 |
| 4,145,208 | 3/1979 | Gulko et al. | 71/29 |
| 4,177,052 | 12/1979 | Entzmann et al. | |
| 4,191,550 | 3/1980 | Hawkins et al. | 71/30 |
| 4,321,078 | 3/1982 | Michaud | 71/64.11 |
| 4,398,936 | 8/1983 | Hoogendonk et al. | |
| 5,171,349 | 12/1992 | Vetanovetz et al. | |
| 5,395,418 | 3/1995 | Vetanovetz et al. | |
| 5,454,850 | 10/1995 | Biamonte et al. | |
| 5,494,498 | 2/1996 | Young | 71/30 |

FOREIGN PATENT DOCUMENTS

| | | | |
|---|---|---|---|
| 84196 | 7/1983 | European Pat. Off. | |
| 161395 | 11/1985 | European Pat. Off. | |
| 427094 | 5/1991 | European Pat. Off. | |
| 485225 | 5/1992 | European Pat. Off. | |
| 634380 | 1/1995 | European Pat. Off. | |
| 9528369 | 10/1995 | European Pat. Off. | C05G 3/00 |
| 851445 | 7/1989 | Finland . | |
| 941759 | 3/1997 | Finland . | |
| 52-075571 | 6/1977 | Japan . | |
| 1268248 | 3/1972 | United Kingdom . | |
| 2034682 | 6/1980 | United Kingdom | C05B 15/00 |
| 2136789 | 9/1984 | United Kingdom . | |
| 95/28369 | 10/1995 | WIPO . | |

Primary Examiner—Wayne Langel
Assistant Examiner—Melanie C. Wong
Attorney, Agent, or Firm—Andrus, Sceales, Starke & Sawall

[57] ABSTRACT

The invention relates to a stable, concentrated aqueous fertilizer suspension, which can be diluted with water to provide a working solution. The suspension contains 10 to 60% by weight of water and 40 to 90% by weight of a plant nutrient composition based on at least a calcium, and/or a magnesium and a phosphate ion, and the suspension comprises at least one plant nutrient containing water-insoluble solid particles with a particle size less than 50 $\mu$m, the pH of the suspension being in the range of 0.5 to less than 2.

18 Claims, No Drawings

AQUEOUS FERTILZER SUSPENSION CONTAINING AT LEAST PHOSPHATE IONS AND CALCIUM OR MAGNESIUM IONS AND A USE OF THE SUSPENSION

BACKGROUND OF THE INVENTION

This invention relates to a stable, concentrated aqueous fertilizer suspension, which can be diluted with water to provide a working solution in water irrigation systems.

Besides nitrogen, potassium, magnesium and trace elements, calcium and phosphorus are vital plant nutrients, which should be constantly available to plants. Irrigation fertilisation usually comprises water-soluble fertilizers, often prepared as a concentrate solution, added to the irrigation water at intervals. If such a concentrate solution/fertilizer solution contains calcium and/or magnesium salts and ordinary water-soluble phosphorus sources such as for instance monoammonium phosphate, diammonium phosphate or potassium phosphate, the pH of the solution will be so high that calcium forms insoluble phosphate salts. The insoluble component precipitates, thus clogging the irrigation systems, and its nutrients are no longer in a form which the plants can utilise. The trace elements, added as sulphates or nitrates, also tend to precipitate under these conditions, and for this reason expensive chelate forms are normally used to prevent this. Thus the preparation and use of P, NP, PK and NPK fertilizers containing calcium and/or magnesium in irrigation systems are tricky. A solution to the precipitation problems entailed by water irrigation fertilizers containing calcium and/or magnesium and phosphorus could involve supplying the solution containing calcium and/or magnesium and phosphorus by means of two discrete irrigation systems in parallel. However, such an implementation would be complicated and obviously quite costly.

In U.S. Pat. Nos. 5,171,349 and 5,395,418 the phosphorus source consists of water-soluble urea phosphate, which reduces the pH of the fertilizer concentrate solution and helps keeping the calcium in a dissolved state. Here the calcium source consists of calcium nitrate. Nevertheless, this method involves the drawback of an extremely low, 2 to 40% salt content of the fertilizer solution, implying high transport costs, since the fertilizer solution may contain up to 60 to 98% of water. In practical application, the cultivator thus has to prepare the solution himself by blending solid raw materials, taking care that overdosing does not entail unexpected precipitates in the fertilizer concentrate solution. This requires that the cultivator is well informed and has adequate skills, which are not always available for instance in less developed countries. Moreover, a fully water-soluble phosphorus fertilizer raw material is expensive, and may thus be used to a very limited extent in poor countries.

EP patent application 84 196 and U.S. Pat. No. 4,177,052 disclose liquid suspensions containing calcium and phosphorus, but these already contain components that are totally water-insoluble, and due to sedimentation problems, they are unusable in water irrigation systems.

JP patent application 52 75571 discloses a fertilizer solution containing calcium and phosphorus, which has been prepared from hydrated or burnt lime or calcium carbonate by dissolving with a mixture of phosphoric acid, nitric acid and hydrochloric acid, but here too, the low salt content due to the solubility of the fertilizer solution involves a problem. Moreover, this acid mixture would require special anti-corrosive materials in the irrigation system.

The applicant's FI patent application 941759 describes a fertilizer suspension suitable for drip irrigation, wherein the solid particles are of micron particle size.

SUMMARY OF THE INVENTION

The object of this invention is to provide a liquid NP, PK or NPK fertilizer suitable for water irrigation systems, which makes it possible to avoid calcium and/or magnesium and phosphorus precipitation in the mixture as well as the drawbacks of the above fertilizers.

The main characteristics of the invention are set out in the accompanying claims.

In accordance with the invention it has been surprisingly found that it is possible to prepare such liquid fertilizers containing calcium and phosphorus from a number of raw materials that have a high salt content and do not cause problems in irrigation systems.

Thus the invention relates to a stable, concentrated aqueous fertilizer suspension, which can be diluted with water to form a working solution, said suspension containing 10 to 60% by weight of water and 40 to 90% by weight of a plant nutrient composition based on at least a calcium and/or magnesium and phosphate ion, and said suspension comprising at least one plant nutrient containing water-insoluble solid particles with a particle size less than 50 $\mu$m and a pH value in the range of 0.5 to less than 2.

The invention enables such liquid fertilizer concentrates containing calcium and/or magnesium and phosphorus to be prepared, which in addition to these nutrients contain N, K or NK and trace elements in the form of sulphates, nitrates, phosphates, chlorides or chelates, by preparing a suspension of micron particle size, whose salt content may be 40 to 90% by weight and in which the solid particles have a particle size under 50 $\mu$m. A high salt content can be achieved by applying suspension techniques. The precipitation of calcium and/or magnesium with phosphates into insoluble salts can be prevented by regulating the pH of the suspension to a level low enough, for instance by using phosphoric acid. When such a liquid fertilizer concentrate is diluted in irrigation water, an NPK nutrient solution containing calcium and/or magnesium is obtained, in which the calcium and/or magnesium is also in a form usable along with phosphorus for plants and in irrigation systems, owing to its sufficient acidity. Production and transport costs are low and the cultivator only has to select an appropriate amount to be dosed in the water irrigation system. The suspension can also be prepared from normal, even cheap fertilizer raw materials. A high quality suspension can be prepared by using known pearl mill grinding with a high salt content and with a low pH. Even if the suspension raw materials would consist of calcium and/or magnesium and phosphorus components along with some partly or totally water-insoluble components, they will be so finely divided with the micro-grinding techniques applied here, that the suspension does not involve any problems when diluted into irrigation water. The suspension particle size being small enough, i.e. less than 50 $\mu$m, and its salt content high enough, stable liquid fertilizers will be provided.

In the aqueous fertilizer suspension of the invention, the solid particles have a particle size less than 50 $\mu$m the lower limit of the particle size being typically approx. 0.01 $\mu$m. The particle size of the solid particles is preferably in the range of 0.2 to 20 $\mu$m in the main.

The aqueous fertilizer suspension of the invention contains preferably 20 to 50% by weight, most preferably 25 to 45% by weight of water and preferably 50 to 80% by weight, most preferably 55 to 75% by weight of plant nutrient composition based at least on a calcium, and/or magnesium and phosphate ion.

The fertilizer raw materials of the aqueous fertilizer suspension of the invention may comprise phosphoric acid, calcium nitrate, calcium chloride, calcium sulphate, potassium sulphate, ammonium sulphate, diammonium phosphate, urea phosphate, monoammonium phosphate, urea, potassium chloride, potassium nitrate, potassium phosphate, ammonium nitrate, magnesium sulphate, magnesium nitrate, magnesium chloride, methylene urea and potassium carbonate.

As a substance containing a plant nutrient, the aqueous fertilizer suspension of the invention may additionally contain one or more micronutrients (trace elements). Examples of usable micronutrients are boric acid, borates, sodium molybdate, sodium selenate, potassium selenate, potassium iodide, chromium chloride and iron, copper, cobolt, manganese and zinc in the form of phosphates, sulphates, chlorides, carbonates or chelates and further other substances containing N, P, K or trace elements. The trace elements and nutrient salts act as stabilisers themselves in the suspension.

If necessary, the aqueous fertilizer suspension in accordance with the invention may contain known water-soluble stabilisers to promote stability, for instance gelling hydrophilic polymers, such as polysaccharides. In addition, other usual fertilizer additives can be added.

To regulate the pH value, the following are applicable besides phosphoric acid: sulphuric acid, nitric acid, maleic anhydride, formic acid, oxalic acid, citric acid, acetic acid and $C_2-C_4$ dicarboxylic acid. By reducing the pH for instance with phosphoric acid and diluting the suspension with water to form an e.g. 10% solution, the amount of solid particles remaining in the solution will be markedly smaller than that of a solution prepared at normal pH, and the risks of clogging will be reduced. A low pH is also advantageous in irrigation waters with a high pH, because the sedimentation risk and the risk of organism growth decrease with a lower pH. A low pH of the solution is also profitable in a soil with a high pH, because phosphorus solubility, and thus the phosphorus amount absorbed by the plant, increase at a low pH.

A fertilizer solution used in water irrigation systems is typically diluted to a concentration of approx. 0.1 to 0.2% by weight.

DETAILED DESCRIPTION OF THE INVENTION

The invention will be described in greater detail below by means of working examples, without, however, limiting the invention to these alone.

EXAMPLE 1

A suspension with a 70% salt content and a pH of 0.8 was prepared from 17.2% of urea, 34.6% of calcium nitrate, phosphoric acid (50% concentration) and 22.0% of water. The salt content of the phosphoric acid was made up by a 100% amount of $H_3PO_4$. The raw materials were admixed with water in a disperser and subsequently the suspension was pumped into a mill, where it was prepared into a suspension with a particle size in the range of 0.01 to 20 $\mu$m. The suspension viscosity was determined as 1800 mPas and it was fluid and homogenous. The $N-P_2O_5-K_2O$ nutrient concentrations were 13-13-0 and Ca 6.5. During storage, the suspension developed a thin liquid layer at its surface, which adequately prevents the suspension surface from drying, the remainder of the suspension being homogenous. The water layer disappeared under the effect of light shaking. When diluted in irrigation water, the suspension did not leave any sediment.

EXAMPLE 2

A suspension with a 72% salt content and a pH of 1.2 was prepared as in example 1 from 39.7% of urea phosphate, 32.1% of calcium nitrate and water. The $N-P_2O_5-K_2O$ nutrient concentrations of this liquid fertilizer were 12-17-0 and Ca 6. The suspension viscosity was 560 mPas and its was fluid and homogenous. During one year of storage the suspension had developed a small amount of water on the surface, but under light stirring it became fluid and homogenous.

EXAMPLE 3

A suspension with a 77% salt content and a pH of 1.4 was prepared as in example 1 from 8.1% of urea, 24.1% of potassium nitrate, 29.1% of calcium nitrate, 22.0% of phosporic acid and water. The $N-P_2O_5-K_2O$ nutrient concentrations of this liquid fertilizer were 11-11-11 and Ca 5.5. The product was stored for 9 months, remaining homogenous, and under the effect of light shaking it also became fluid.

EXAMPLE 4

A suspension with an 85% salt content and a pH of 1.9 was prepared as in example 1 from 18.1% of urea, 25.8% of potassium nitrate, 25.4% of calcium sulphate, 22.8% of phosphoric acid and water. The $N-P_2O_5-K_2O$ nutrient concentrations of this liquid fertilizer were 12-12-12 and Ca 6.0.

EXAMPLE 5

The liquid NPK fertilizers containing calcium and phosphorus prepared in examples 3 and 4 were tested in lettuce cultivation, the reference fertilizers being an aqueous solution (A) prepared from urea phosphate and calcium nitrate, a solid commercial water-soluble fertilizer dissolved as such in water (B) and fertilizer (B) with an addition of calcium nitrate (C). These fertilizers were dosed in the irrigation water for lettuce such that the calcium concentrations in the irrigation water were theoretically equal. The calcium concentration determined in lettuce cultivated in peat was highest with solution (C) and the suspension of example 2, followed by solution (A), the suspension of example 3 and fertilizer (B) came last. The calcium concentration determined in lettuce cultivated in rock wool was highest with solution (C), followed by the suspension of example 2, then the suspension of example 3, solution (A) and last fertilizer (B). The test indicated that calcium remains in a form usable for the plants with the suspensions of the invention, and when diluted into the irrigation water, the suspensions did not produce water-insoluble calcium or magnesium phosphates.

EXAMPLE 6

A suspension with an 82% salt content and a pH of 1.7 was prepared as in example 1 from 8.4% of urea, 40.6% of potassium nitrate, 20.0% of calcium sulphate, 18.6% of phosphoric acid and water. The $N-P_2O_5-K_2O$ nutrient concentrations of this liquid fertilizer were 9-9-19 and Ca 4.6.

EXAMPLE 7

A suspension with an 84% salt content and a pH of 1.6 was prepared as in example 1 from 4.7% of urea, 38.8% of potassium nitrate, 15.7% of calcium sulphate, 34.9% of phosphoric acid and water. The $N-P_2O_5-K_2O$ nutrient concentrations of this liquid fertilizer were 7-17-18 and Ca 3.6.

EXAMPLE 8

A suspension with an 84% salt content and a pH of 1.9 was prepared as in example 1 from 33.2% of urea, 9.0% of potassium nitrate, 35.7% of calcium sulphate, 8.2% of phosphoric acid and water. The N-P$_2$O$_5$-K$_2$O nutrient concentrations of this liquid fertilizer were 17-4-4 and Ca 8.3.

EXAMPLE 9

A suspension with an 89% salt content and a pH of 1.3 was prepared as in example 1 from 42.1% of potassium nitrate, 20.4% of calcium nitrate, 37.4% of phosphoric acid and water. The N-P$_2$O$_5$-K$_2$O nutrient concentrations of this liquid fertilizer were 9-19-19 and Ca 4. The suspension was a homogenous, fluid product. After one year of storage, water had separated to some extent from the suspension, however, very light shaking made the product homogenous and highly fluid.

EXAMPLE 10

A suspension with an 89% salt content and a pH of 1.1 was prepared as in example 1 from 31.3% of potassium nitrate, 37.7% of calcium nitrate, 28.6% of phosphoric acid and water. The-N-P$_2$O$_5$-K$_2$O nutrient concentrations of this liquid fertilizer were 10-14-14 and Ca 7 and it had a viscosity of 1,900 mpas. The suspension was a homogenous, fluid product.

EXAMPLE 11

A suspension with an 86% salt content and a pH of 0.7 was prepared as in example 1 from 5% of urea, 41.2% of potassium nitrate, 13.6% of calcium chloride, 37.1% of phosphoric acid and water. The N-P$_2$O$_5$-K$_2$O nutrient concentrations of this liquid fertilizer were 8-19-19 and Ca 2.6. After 7 months of storage the suspension became a homogenous and fluid liquid by means of light stirring.

EXAMPLE 12

A suspension with an 80% salt content and a pH of 1.1 was prepared as in example 1 from 34.6% of urea, 9.4% of potassium nitrate, 30.3% of calcium chloride, 8.5% of phosphoric acid and water. The N-P$_2$O$_5$-K$_2$O nutrient concentrations of this liquid fertilizer were 17-4-4 and Ca 6. After 7 months of storage the suspension was sticky, but slightly diluted with water it became a fluid liquid.

EXAMPLE 13

A suspension with an 84% salt content and a pH of 0.9 was prepared as in example 1 from 18.8% of urea, 26.8% of potassium nitrate, 21.6% of calcium chloride, 24.5% of phosphoric acid and water. The N-P$_2$O$_5$-K$_2$O nutrient concentrations of this liquid fertilizer were 12-12-12 and Ca 4.

EXAMPLE 14

A suspension with an 81% salt content and a pH of 0.8 was prepared as in example 1 from 8.7% of urea, 42.0% of potassium nitrate, 17.0% of calcium chloride, 19.3% of phosphoric acid and water. The N-P$_2$O$_5$-K$_2$O nutrient concentrations of this liquid fertilizer were 10-10-19 and Ca 3.

EXAMPLE 15

A suspension with a 79% salt content and a pH of 1.6 was prepared as in example 1 from 4.6% of urea, 37.9% of potassium nitrate, 12.5% of calcium chloride, 34.2% of phosphoric acid and water. The N-P$_2$O$_5$-K$_2$O nutrient concentrations of this liquid fertilizer were 7-17-17 and Ca 2.4.

EXAMPLE 16

A suspension with an 83% salt content and a pH of 1.8 was prepared as in example 1 from 9.3% of urea, 45.1% of potassium nitrate, 14.4% of calcium chloride, 20.7% of phosphoric acid and water. The N-P$_2$O$_5$-K$_2$O nutrient concentrations of this liquid fertilizer were 10-10-21 and Ca 2.7.

EXAMPLE 17

A suspension with a 45% salt content and a pH of 1.9 was prepared as in example 1 from 6.2% of urea, 12.7% of calcium nitrate, 17.5% of potassium sulphate, 2.5% of magnesium sulphate, 0.8% of trace elements: 5.5% of Fe, 1.1% of B, 0.6% of Cu, 5.5% of Mn, 0.6% of Zn, 0.03% of Co, 0.05% of J, 0.06% of Cr and 0.11% of Mo, and 7.9% of phosphoric acid and 52.4% of water.

EXAMPLE 18

A suspension with a 52% salt content and a pH of 1.8 was prepared as in example 1 from 6.7% of urea, 13.8% of calcium nitrate, 19.0% of potassium sulphate, 5.3% of magnesium sulphate, 0.9% of trace elements: 5.5% of Fe, 1.1% of B, 0.6% of Cu, 5.5% of Mn, 0.6% of Zn, 0.03% of Co, 0.05% of J, 0.06% of Cr and 0.11% of Mo, and 8.6% of phosphoric acid and 45.7% of water. The N-P$_2$O$_5$-K$_2$O nutrient concentrations of this liquid fertilizer were 5-4-10 and Ca 3. The suspension was homogenous and highly fluid, with a viscosity of 1,500 mpas.

I claim:

1. A stable, concentrated aqueous fertilizer suspension, which can be diluted with water to form a working solution, wherein the suspension contains 10 to 60% by weight of water and 40 to 90% by weight of a plant nutrient composition based on at least a calcium and/or a magnesium and a phosphate ion, and in that the suspension comprises at least one plant nutrient containing water-insoluble solid particles with a particle size less than 50 μm, and in that the suspension has a pH in the range from 0.5 to less than 2.

2. Aqueous fertilizer suspension as claimed in claim 1, wherein it contains 20 to 50% by weight, of water and 50 to 80% by weight, of the plant nutrient composition based on at least a calcium and/or a magnesium and a phosphate ion.

3. Aqueous fertilizer suspension as claimed in claim 2, wherein the substance(s) in the plant nutrient composition containing a calcium ion are selected from the group consisting of calcium nitrate, calcium chloride and calcium sulphate.

4. Aqueous fertilizer suspension as claimed in claim 2, wherein the substance(s) in the plant nutrient composition containing a magnesium ion are selected from the group consisting of magnesium nitrate, magnesium sulphate and magnesium chloride.

5. Aqueous fertilizer suspension as claimed in claim 2, wherein the substance(s) in the plant nutrient composition containing a phosphate ion are selected from the group consisting of the following field fertilizer grade NPK raw materials: phosphoric acid, monoammonium phosphate, diammonium phosphate, urea phosphate and potassium phosphate.

6. Aqueous fertilizer suspension as claimed in claim 1 wherein the substance(s) in the plant nutrient composition containing a calcium ion are selected from the group consisting of calcium nitrate, calcium chloride and calcium sulphate.

7. Aqueous fertilizer suspension as claimed in claim 1 wherein the substance(s) in the plant nutrient composition containing a magnesium ion are selected from the group consisting of magnesium nitrate, magnesium sulphate and magnesium chloride.

8. Aqueous fertilizer suspension as claimed in claim 1 wherein the substance(s) in the plant nutrient composition containing a phosphate ion are selected from the group consisting of the following field fertilizer grade NPK raw materials: phosphoric acid, monoammonium phosphate, diammonium phosphate, urea phosphate and potassium phosphate.

9. Aqueous fertilizer suspension as claimed in claim 1 wherein the plant nutrient composition further contains as plant nutrient(s) other field fertilizer grade NPK raw materials selected from the group consisting of urea, ammonium sulphate, ammonium nitrate, potassium sulphate, potassium chloride, methylene urea, potassium nitrate and potassium carbonate.

10. Aqueous fertilizer suspension as claimed in claim 1 wherein the plant nutrient composition further contains one or more micronutrients.

11. Aqueous fertilizer suspension as claimed in claim 10, wherein the micronutrient(s) are selected from the group consisting of boric acid, borates, sodium molybdate, sodium selenate, potassium selenate, potassium iodide, chromium chloride and iron, copper, cobalt, manganese and zinc as phosphates, sulphates, chlorides, carbonates or chelates.

12. Aqueous fertilizer suspension as claimed in claim 1, wherein the pH of the aqueous solution is regulated in the range from 0.5 to less than 2 with a pH regulator selected from the group consisting of phosphoric acid, sulphuric acid, maleic anhydride, formic acid, oxalic acid, citric acid, acetic acid and a $C_2$–$C_4$ dicarboxylic acid.

13. Aqueous fertilizer suspension as claimed in claim 1 wherein the suspension contains a water-soluble substance promoting stability.

14. Aqueous fertilizer suspension as claimed in claim 13 wherein said water-soluble substance promoting stability is a polysaccharide.

15. Aqueous fertilizer suspension as claimed in claim 1 further defined as a water irrigation systems fertilizer suspension.

16. A method for forming a working plant nutrient solution comprising the step of diluting the aqueous fertilizer suspension of claim 1 in water.

17. The method as claimed in claim 16 further defined as diluting the aqueous fertilizer suspension of claim 1 in the water of a plant irrigation system.

18. Aqueous fertilizer suspension as claimed in claim 1, wherein it contains 25 to 45% by weight of water and 55 to 75% by weight of the plant nutrient composition based on at least a calcium and/or a magnesium and a phosphate ion.

* * * * *